Jan. 13, 1953     L. P. GARNER ET AL     2,625,637
HIGH-FREQUENCY INDUCTION WELDING APPARATUS AND PROCESS
Filed March 30, 1948     3 Sheets—Sheet 1

INVENTORS
Lloyd P. Garner &
William N. Parker
BY William A. Zaleski
ATTORNEY

Patented Jan. 13, 1953

2,625,637

UNITED STATES PATENT OFFICE 2,625,637

HIGH-FREQUENCY INDUCTION WELDING APPARATUS AND PROCESS

Lloyd P. Garner and William N. Parker, Lancaster, Pa., assignors to Radio Corporation of America, a corporation of Delaware Application March 30, 1948, Serial No. 17,824

5 Claims. (Cl. 219—4)

Our invention relates to welding processes and more particularly to a fusion welding process and apparatus.

A fusion welding process accomplishes a joining of metal parts by actual fusion, either of a portion of the parts to be joined or of an extra supply of a similar metal. One of several heat sources may be employed in accordance with conventional methods, such as a gas flame, an electric arc or an exothermic chemical reaction.

Welding processes employing heat sources of this type possess several inherent disadvantages. They usually involve a step by step operation, the heat source moving along the work until the entire length of the joint has been traversed. This results in a constantly changing pattern of thermal stresses which often are accompanied by serious mechanical deformations of the work. In addition, products of combustion or arc electrode material may cause serious contamination of the work. Another substantial disadvantage is the relatively slow production rate of the former welding procedures referred to. Furthermore, the heat transferred to the work is usually of such high order as to substantially raise the temperature of the work pieces at regions thereof remote from the weld. This is particularly objectionable where the work pieces have previously been sealed to a glass member, since the rise in temperature of the work pieces incidental to former welding procedures may harmfully affect the glass-to-metal seals. The heat spread characteristics of the former processes may also interfere with the use of desirable jigs required for properly positioning and holding the work pieces.

A general object of the invention is to provide a welding method and apparatus therefor that is free from the disadvantages enumerated above.

A more specific object is to provide a welding apparatus that accomplishes a good weld without contacting the work pieces, thereby eliminating contamination of the work by the welding apparatus.

Another object is to enable the making of welds of relatively high mechanical accuracy.

According to the principal feature of our invention the above objects are attained by the utilization of a high frequency induction heating means. The utilization of induction heating for welding, however, is accompanied by many problems. These problems arise from the nature of the heat source involved. This heat source, comprising $I^2R$ losses in the currents induced in the work pieces to be welded, requires accurate control as to the area and shape of the portion of the work pieces involved in the weld, as well as the depth to which it is desired that fusion is to take place. It is also necessary for a good weld produced by induction heating that the duration of the welding cycle be accurately controlled. Obviously, an excessively long welding cycle may result in a displacement of the fused metal from the location at which a weld is desired.

Another problem associated with welding procedures by high frequency induction is that of securing a uniform weld. In some applications, such as the fabrication of electron discharge devices, it is necessary that the weld be uniform to provide a vacuum tight joint. It has been found in heating by induction, especially where a single-turn work coil has been used, serious interference with the uniformity of the heat application has resulted from objectionable lead effects. These objectionable effects occur as a result of reduction in flux concentrations adjacent the location at which the leads join the coil, as a consequence of which least heating occurs at such locations with a resultant non-uniformity of the weld.

It is therefore a further object of the invention to provide a welding apparatus and process utilizing high frequency induction as the heat source in a manner which permits heat to be applied only to predetermined restricted portions of the work pieces.

Another object is to heat work pieces by high frequency induction to fusion temperature of said work pieces uniformly along a predetermined area and to a desired depth thereof.

Another object is to accurately control the time of duration of a welding cycle.

An additional object is to eliminate induced lead effects in a high frequency induction welding apparatus.

In some types of work, metal work pieces may already have been sealed to glass or other material and it is therefore necessary that the welding of such work pieces be carried out with an amount of heat sufficiently small so as not to harm the glass-to-metal or other previously made seals. Furthermore, jigs employed for positioning the work pieces should not be heated excessively since if subjected to such excessive heat they will either become fused to the work pieces or they may set up objectionable strain patterns in the work they support.

It is therefore another object of the invention to reduce the total amount of heat required for a good weld by high frequency induction.

A still further object is to provide an apparatus and process for induction welding wherein heat is applied to the work at a relatively high rate for a relatively short time.

An additional object is to provide a welding process and apparatus using high frequency induction as the heat source for welding metal work pieces supported in jigs or previously sealed to glass or other material, without harming the jigs or the previously made seals.

Another object is to provide a process which preconditions work pieces to be welded by high frequency induction, by raising the resistance thereof to the flow of the electrical energy to a predetermined value.

A further object is to subject work pieces to be welded to a predetermined sequence of current intensities for accomplishing a good weld.

These and further objects and advantages of the invention will become apparent as the present description proceeds.

Referring to the drawing.

Our novel apparatus and method may be employed both for direct welding of surfaces to be joined as well as for brazing operations wherein an intermediate metal is utilized. In the case of direct welding of the work pieces, a portion of the metal of each piece becomes molten or plastic and combines to form an intimate mixture. Brazing processes do not require the surfaces to be joined to be either molten or plastic but employ an intermediate metal or alloy having a lower melting point than the metal of which the work pieces is composed.

According to our invention there is provided at the junction of two or more metallic objects to be joined, an intense heat over the entire length of the junction, by alternating electric currents induced directly into the metal at the junction referred to. Suitable controls enable adjustment to a required frequency, power and duration of the currents, depending upon the melting point of the metal at the junction. This metal may be either a brazing material having a relatively low melting point or it may be the constituent metal of the work pieces to be jointed, which may have a much higher melting point.

We have found that a readily controlled heat quantity can be obtained by induction from an electrical conductor. The heat quantity can be accurately controlled by modifying either the frequency or wattage of the electrical energy employed in the conductor, or both of these characteristics of the energy may be varied in predetermined ratios. In addition to a control of the heat quantity, our invention also permits of an accurate time control. This control resides in interrupting the power source after a welding cycle of any desired duration has taken place. The rate of heat transfer to the work pieces to be welded can thus be accurately controlled.

The rapidity with which heat may be generated in the work pieces in accordance with our invention permits the use of a very large heat quantity for a very short time interval. This concentrated heat quantity is sufficient to fuse the metals to be joined without excessively heating adjacent portions of the work pieces. This results in a lower order of total heat quantity required as well as in the prevention of strains in the work pieces.

A feature of our invention relates to means for modulating the current intensities induced into the work. Since our novel apparatus and method avails itself of $I^2R$ losses in the currents induced in the work pieces as the heat producing agent, an increase in the resistance of said work pieces to the flow of the induced currents will facilitate the generation of an increased heat therein. We take advantage of this fact by modulating the current intensity during a welding cycle in such a manner that at first a relatively small value of intensity is used, which serves to pre-heat the work pieces. This increases the resistance of the work pieces to the flow of subsequent electrical current. Such subsequent currents are then increased substantially for a small fraction of the duration of the welding cycle, which results in a fusion of an extremely localized portion of the work pieces. During the remainder of the welding cycle the current intensity is permitted to fall off to a value preferably lower than the initial current intensity which serves to anneal the portion of the work pieces involved in the weld and to relieve any mechanical strains that may have been set up therein.

An additional feature of our invention concerns the frequency range of the currents induced in the work pieces to be welded. We have found that an extremely wide range of frequencies is suitable for our novel welding method; for example, frequencies from 15 kc. to 15 megacycles may be used successfully, and in some instances frequencies of substantially higher or lower value than the limits indicated may be utilized satisfactorily.

The recognition of the availability of this relatively wide frequency range for welding by induction is significant in connection with a further feature of the invention. This further feature concerns the adaptability of our welding apparatus and method to a wide variety of different types of welds. To be completely successful, it is necessary that a welding method be suitable for any type of weld desired. Obviously if it is limited to a relatively few welding jobs it would find no place in our highly competitive industrial activities since a plurality of different welding apparatuses would be required for a plurality of different types of welds which would involve a prohibitive cost. Attempts heretofore to use inductively developed heat for welding purposes have been subject to this limitation and as a result, induction welding has not been used on any extensive scale. The realization that a much wider frequency range can be used for induction welding than heretofore thought possible, makes it feasible according to our novel method and apparatus to make welds of any desired type. For example, we can successfully make a relatively shallow weld or a relatively deep weld by selecting appropriate frequencies. In this connection we take advantage of the well known skin effect from which it is appreciated that currents of high frequencies penetrate below the surfaces of the work pieces to a lesser degree than currents of a lower frequency. The nature of the weld can also be determined by the power of the induced currents. A further contribution to the universal character of our welding method and apparatus resides in the recognition that the cross sectional shape of the welding coil from which currents are induced into the work pieces, can also determine the type of weld produced. Thus, a coil having a cross sectional shape wherein the side facing the work pieces is sharply tapered, will make a relatively deep weld, whereas, a coil having a relatively broad taper will provide a relatively shallow weld, assuming the coil is energized similarly in each instance and the distance from the coil to the work pieces remains the same. In addition to modifying the cross sectional shape of the welding coil to accommodate it to a desired type of weld, the coil may also be of an overall shape to coincide with the shape of any work pieces.

A further feature of our invention resides in means for avoiding undesirable lead effects at the junction of the applicator coil and its leads. Since the currents fed to the coil are characterized by an appreciable voltage, it is necessary to provide some means for preventing voltage breakdown between the leads. In the past the expedience of substantial separation of the leads from each other has been employed. This, however, is objectionable since an appreciable separation of the leads, particularly at their junction with the applicator coil, results in objectionable lead effects, which produce non-uniform heating. This condition is caused by a reduction in the flux concentration at the location of the lead-coil junction. To overcome this difficulty we have provided means whereby the leads may be placed relatively close together throughout their lengths without danger of voltage breakdown.

Another expedient for overcoming bad lead effects resides in practicing a step contemplated by our invention. The step comprises rotating the parts to be welded on their axes at a relatively high angular velocity through a non-uniformly concentrated radio frequency field produced by a deficient lead correction. In addition to being advantageous in correcting bad lead effects a rotation of the work pieces requires a less critical alignment thereof, since the various portions of the work pieces are periodically exposed to differently concentrated portions of the radio frequency field, said differently concentrated portions resulting mainly from misalignment of the work pieces with respect to the work coil and/or bad lead effects of the coil.

A still further feature of our invention is its rapid operation and suitability for automatic operation. Since the heat source is electrical, the novel apparatus of our invention is easily accommodated to a welding system energized by a common electrical potential source.

One of the outstanding features of the invention is the realization that the duration of the welding time or cycle must be extremely short, in some instances a small fraction of a second, and the provision of means for accomplishing this control. We have found that utilization of the higher frequencies for induction welding results in an extremely rapid temperature rise in the work pieces. Unless this temperature rise is accurately controlled, it may continue appreciably beyond the point at which the heated portions of the work pieces become fluid. In these circumstances the molten metal will flow away and cause a defective weld. The accuracy of control provided by our invention is such that the heat input to the work pieces is considerably reduced immediately on liquifaction of the heated portion of the work pieces. This allows no time for the molten metal to flow away. However, the tendency of the molten metal from each of the work pieces to blend together so as to form a solution, is greater than either the force of gravity or the mechanical force resulting from the effect of the current flow in the coil upon the conducting fluid metal of the work pieces. The time duration of the higher current intensities induced into the work pieces is therefore controlled in such a manner that a portion of the metals of the work pieces is permitted to become fluid and respond to their natural tendency to mix together, but the fluid condition is not permitted to continue for such length of time as would be required for it to respond in motion to the force of gravity and centrifugal forces, in the event the work rotates during the welding operation. While a force is exerted on the molten metal resulting from the reaction between the electric currents in the work coil and the work field, this force is advantageous in several respects.

It is thus apparent from the foregoing general description of the invention that we have recognized and overcome problems in connection with welding by high frequency electrical induction that have heretofore been regarded insurmountable and which have been responsible for failure to use this heat agency for welding in the past. Not only have we found that much higher frequencies than have been recognized in the past, are suitable for induction welding, but that the rate of heat rise in the work pieces may be controlled either by controlling the frequency of the currents induced in the work pieces or the power of such currents. Further, where frequency control is availed of for this purpose, we overcome the limitation of the well known skin effect by suitably shaping the applicator coil in cross section to secure a deeper or shallower weld than that ordinarily associated with a given frequency. Furthermore, we have made induction welding practical for accomplishing uniform welds by eliminating undesired lead effects. In addition, we have recognized that the duration of the welding cycle is extremely critical.

Figure 1:
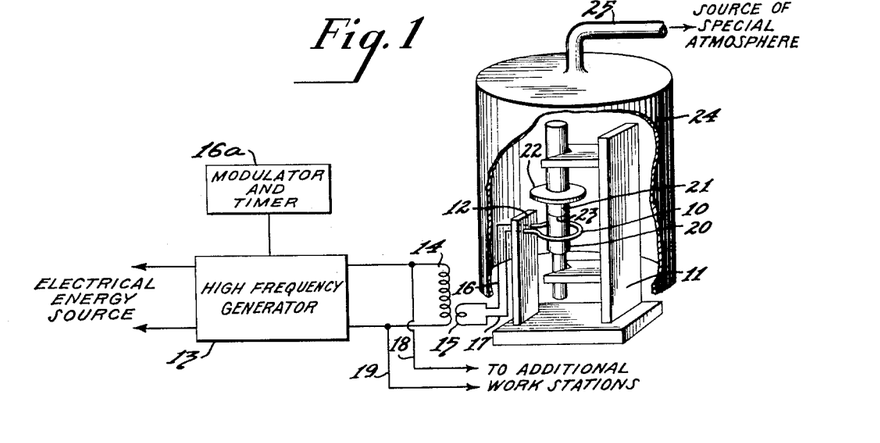
Figure 1 shows a high frequency induction system incorporating our invention.

Referring now in more detail to the drawings wherein specific embodiments of our invention are presented for illustrative purposes only and not by way of limitation, there is shown in Figure 1 a welding system that incorporates our invention. This system comprises an electrically energized applicator coil 10, a jig 11 for supporting the work pieces 20, 21 to be joined in a weld and a bell 24 serving to isolate a special enclosed atmosphere such as hydrogen or helium, fed through duct 25, in which the welding operation is performed. The coil 10 is supported in a desired position by support 12 and is indirectly coupled to the output of a high frequency generator 13 through a step-up transformer including windings 14, 15 and leads 16, 17. The generator is connected to a suitable source of electrical energy and is associated with a modulator and timer 16a which serves to control the time duration of a welding cycle as well as the characteristics of the generator output during such cycle. Additional connections may be taken from the generator output as by leads 18, 19 to other associated welding stations.

Special considerations concern the structure and position with respect to each other of the leads 16 and 17. At the frequencies which we have found desirable the leads 16, 17 are designed to observe certain critical requirements. At the high frequencies mentioned, inductive reactance between the leads is a significant factor that must be kept as low as possible for an efficient employment of these high frequencies. We have found that an effective expedient for reducing inductive reactance between the leads is to place them relatively close together. For best results this spacing between the leads should be less than the width of the leads.

Figures 5, 6, 7:
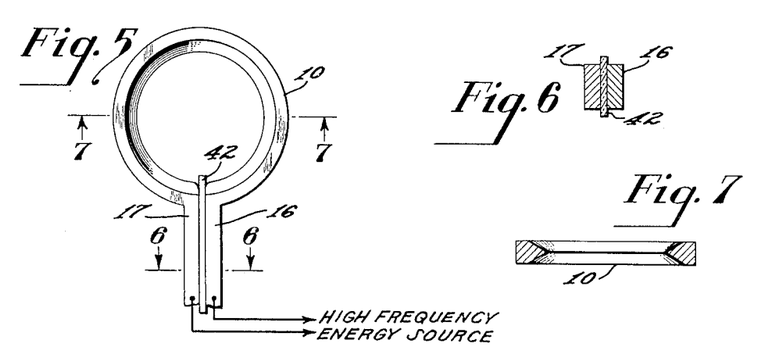
Figures 5, 6 and 7 illustrate a coil structure we may employ for a uniform peripheral weld, which includes means for avoiding undesirable lead effects.

A characteristic of high frequency currents passing through conductors is their tendency to flow on the surfaces of such conductors in accordance with the well known skin effect. However, when such conductors are closely spaced, the currents concentrate on the surfaces thereof that are in mutual face relation. It is therefore desirable that the surfaces of the conductors that face each other be as large as feasible to provide a wide path for the currents concentrated thereon. In recognition of this we make the surfaces of our conductors relatively flat and wide where they face each other, as shown in Figure 6. In one instance, we have employed a sheet of mica insulation between the leads having a thickness of 10 mils. Opposing surfaces of the lead should in this case have a width greater than 10 mils.

Another feature that should characterize leads used in connection with high frequency currents in an induction welding apparatus, is their ability to oppose a tendency to separate in response to the mechanical force produced by the currents flowing in opposite directions in the closely adjacent leads. This ability to oppose the mechanical force urging separation of the leads is provided according to our invention by making the leads relatively large in cross section to confer a sufficiently large mass to them which will be sufficiently resistant to deformation in response to the mechanical force referred to. This force can be readily computed for any one of the various powers and frequencies suitable for our novel apparatus and method, which have previously been referred to, and the modulus of elasticity of the metal of which the leads are composed will determine the thickness of the leads required for successful opposition to this force.

Another characteristic that the leads should possess to render them suitable for our welding apparatus is good thermal capacity. Since, as has been previously indicated, the currents tend to concentrate on the surfaces of the leads that face each other, only a relatively small cross sectional portion of the leads will be directly heated by such currents. However, this heat may reach such values as to melt the lead metal unless quickly dissipated. By making the leads relatively large in cross section a relatively large reserve of metal is provided integral with the metal being directly heated by the currents referred to, for providing good heat dissipation.

We have therefore found that a lead structure that is thick enough to render it suitable for providing mechanical strength to oppose mechanical components of the currents flowing in the leads and to possess a desired thermal capacity characteristic, is also advantageous when at least one side of a lead has a flattened surface suitably spaced from a similar flattened surface on the other lead.

The ohmic resistance of the leads is a negligible factor in view of the high frequency of the currents passing therethrough, but this factor is also kept low by using a metal of low electrical resistance, such as copper.

Our novel welding apparatus is shown in the operation of welding cylindrical members 20, 21 forming parts of an electron discharge device. Member 21 has sealed thereto an annular glass body 22, disposed relatively close to the location 23, at which a weld is desired.

The welding operation is initiated by actuating the modulator and timer 16a, to be more fully described hereinafter. On actuation of the modulator and timer the high frequency generator 13 converts the incoming electrical energy from the electrical energy source into high frequency alternating current which is fed to the primary 14 of generator output transformer 14, 15. The transformer windings 14, 15 are so related that an alternating current of the order of several hundred amperes is induced in the circuit consisting of the secondary 15, the low impedance leads 16, 17 and the applicator coil 10. This high frequency alternating current in turn induces directly in the work pieces 20, 21, a current of considerable magnitude by virtue of the mutual inductance existing between the applicator coil 10 and the work pieces 20, 21. This induced current is localized to adjoining portions of the work pieces by a coil construction to be more fully described herein, whereby the current paths in the work pieces are constricted. The heat developed by $I^2R$ losses in the induced currents in the work pieces causes a portion of the metal at the junction 23 of the work pieces to melt and fuse together in a fraction of a second, thus joining the parts 20, 21. At this time the modulator and timer 16a acts to stop the generation of high frequency current. This stops further heating of the work pieces and the molten portions thereof cool rapidly to a temperature below that at which chemical reaction with air would take place, and the weld is completed. Welded joints so made will have a uniform predetermined depth and may be made so deep and strong that both their electrical and thermal conductivity will be comparable to that of the original parts.

Figure 2:
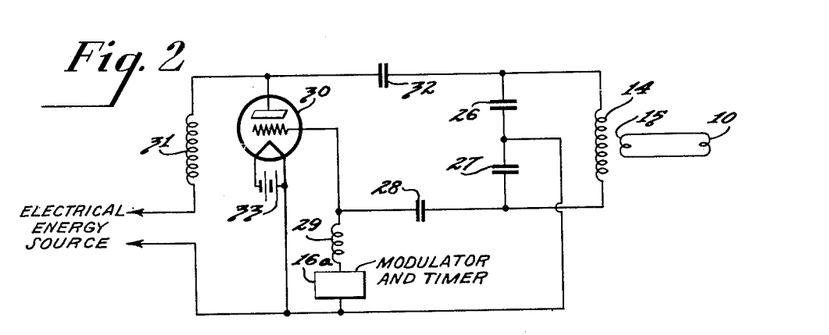
Figure 2 depicts schematically a circuit organization that we prefer to associate with our system.

Figure 2 shows circuit aspects of our novel welding apparatus. This circuit is one of several we may employ and is selected for illustration only. It includes a Colpitts oscillator as a high frequency generator with the primary 14 of the transformer 14, 15 acting as the tank inductor of the oscillatory circuit comprising capacitors 26 and 27 and the inductor 14. A typical primary 14 which we have used consists of a 20 turn solenoid having a diameter of 6 inches and a length of 8 inches. The secondary 15 may consist of a single turn band surrounding the primary 14 and closely spaced with respect thereto. A typical spacing between primary 14 and secondary 15 may be ¼ inch. The capacitor 27 affords grid feedback through grid by-pass capacitor 28.

The applicator coil 10 has been referred to as comprising a single turn, which is the preferred form because of the inherently more uniform spacing to the work that is possible therewith than is permitted by the use of a multi-turn coil. However, we have successfully used a multi-turn coil for high frequency induction welding.

The electron discharge device 30 shown in Figure 2 acts as an oscillator to convert electrical energy from a suitable power source into high frequency energy. It is to be understood, however, that the form of the electron discharge device 30 is not limited to the high vacuum triode illustrated but may be any appropriate electron discharge device capable of passing an electrical current in accordance with high frequency voltages applied to its electrodes so as to convert electrical power from one frequency to another for the duration of the heating cycle of the inductive welding process herein described. It is to be further understood that during the relatively short duty periods used in this type of welding, unusually severe conditions of operation may be involved wherein the electron emitter may be raised to temperatures appreciably greater than the temperature commonly associated with long emitter life. This high temperature may also effect the non-emitting electrodes. It is therefore necessary that the grids and/or other electrodes be provided with a thermal storage capacity that exceeds the thermal capacity usually used for these electrodes in order that the electrical dissipation resulting during the relatively short duty periods may be absorbed without objectionable overheating of said electrodes. One expedient in this connection may be the utilization of radiators associated with the grids or the application of suitable coatings to the plate to aid heat dissipation therefrom. Means for accomplishing such heat dissipation for increasing the thermal storage capacity of electrodes are well known in the art and require no further elaboration herein. Other conventional accessory parts of the high frequency generator shown, are the plate choke 31, the plate blocking capacitor 32, the grid bias voltage source 16a, grid choke 29, and the filament heating source 33.

In the utilization of vacuum tube oscillators as in the modification described, for providing required potentials for induction heating the ratio of tank circulating volt-amperes to delivered watts should be at least 10 for stability and may ordinarily be as high as 50 or so without producing excessive tank circuit losses.

Figure 3:
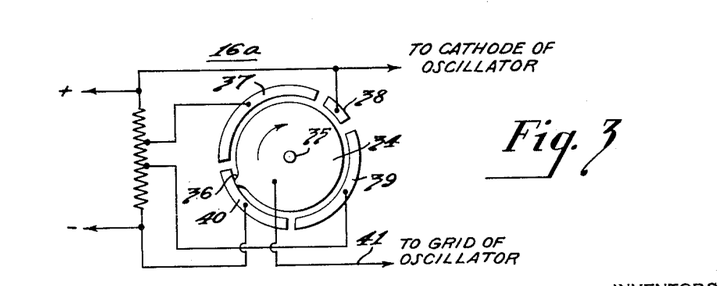
Figure 3 illustrates one way in which the duration of a welding cycle and a potential characteristic thereof may be controlled.

The grid bias source 16a is shown more in detail in Figure 3. This source includes an arrangement whereby the grid bias voltage may be varied rapidly from a value which permits normal operation of the high frequency generator to a value which prevents the generation of high frequency power. This arrangement may include a cylindrical conducting member 34, insulatingly mounted for rotation on shaft 35 and provided with a contact brush 36. Surrounding said cylindrical member or rotor 34, is a series of stators 37, 38, 39, 40, each of which is connected to a suitable power source of an appropriate polarity. The stators referred to are displaced from the rotor 34 so as to be out of electrical contact therewith except through brush 36. Rotation of rotor 34 will cause the brush 36 to contact successively all of said stators.

The shaft 35 is connected to a suitable means not shown for giving desired angular velocity to the rotor 34, in the direction indicated by the arrow. At the position shown the rotor 34 is electrically connected to the negative side of a source of bias voltage. In this position a negative potential will be impressed on the grid of the electron discharge device 30, through lead 41 and grid choke 29, which will render the device non-conducting. As the rotor 34 turns, brush 36 will next engage stator 37, which is connected to a voltage source of less negative polarity than the first source. This will cause the electron discharge device to conduct and a predetermined current intensity will flow through the primary 14 and to the coil 10 through the secondary 15. Stator 37 extends through an appreciable arc so that the energy provided continues for an appreciable length of time. The brush 36 next engages stator 38, which is connected to the positive pole of the voltage source referred to. This increases appreciably the conduction of device 30 with the result that electrical currents of predetermined relatively high intensity are impressed on the coil 10. The duration of such high intensity currents is, however, short, as indicated by the relatively small arcuate extent of stator 38. After leaving stator 38 the brush 36 engages stator 39, which is connected to a more negative voltage source than either of the last two mentioned sources. This more negative voltage renders the device 30 less conducting than when associated with either stator 37 or 38 and provides a current in the coil 10 of lower intensity.

Figure 4:
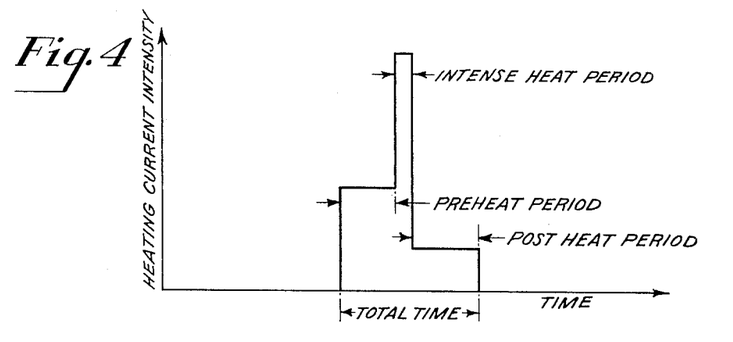
Figure 4 shows a curve of a typical time sequence of heating current intensities produced by the control apparatus shown in Figure 3.

Figure 4 illustrates a typical time sequence of heating current intensities provided by the grid bias control or modulator and timer 16 shown in Figure 3. For example, during the pre-heat period a current of moderate intensity may be used to raise the temperature of the work to a value close to but below the melting point of the metal of the work pieces to be welded. This not only reduces the amount of incremental energy required to melt the metal to form a weld but in most cases raises the electrical resistance of the work. This will in general permit a much more effective heating of the work during the intense heating period required for melting the weld metal. The post heat period may be desirable in some cases to control the rate of cooling of the weld in order to enhance certain metallurgical characteristics of the work.

Figures 5, 6 and 7 illustrate one type of applicator coil we may use. Ordinarily, for heating purposes, the coil 10 is made of a low electrical resistance material, like copper, and has a hollow interior through which a coolant may flow to dissipate electrical losses in the coil. Our novel method and apparatus makes it unnecessary however to rely entirely on hollow coils since for most high frequency welding applications the time of heating is a small fraction of a second. As long as the work pieces are of a lower order of electrical conductivity than the applicator coil, the total heat developed in the applicator coil will be relatively small and can be safely dissipated during the idle periods between welding operations without the use of a fluid coolant. Dispensing with the coolant considerably simplifies coil constructions and set-ups and permits solid coils such as shown at 10 in Figures 5 and 7 to be used. Such coils can be accurately machined to any desired cross section, Figure 7 showing a circular coil having a tapered inner side surface designed for one type of weld.

A further feature of our novel apparatus is shown in Figures 5 and 6. A single turn coil, as has been indicated before herein, permits of relatively close spacing between the coil and the work pieces, and the coil can be made to conform closely to the configuration of the work. Since the impedances of both the applicator coil and the secondary 15 shown in Figure 2 are relatively low, it is important that the series impedance of the leads 16, 17 be kept at a minimum if maximum current in the applicator coil 10 is desired. We have found that wide copper bars 16, 17 shown in Figures 5 and 6, separated by a thin insulation 42, such as mica, will serve very well as low impedance leads. In some cases it may be desirable to insert a predetermined or controllable amount of series impedance in the leads. The leads 16, 17 are relatively closely spaced from each other, particularly at this junction with coil 10. This close spacing of the leads contributes to the formation by the coil of a uniform flux pattern with consequent uniformity in the weld. The thin insulation 42 disposed between the leads prevents voltage breakdown therebetween that the close spacing referred to might otherwise cause.

Figure 8:
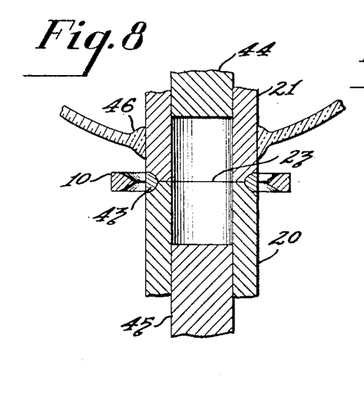
Figures 8, 9, 10 and 11 show coils having different cross sectional shapes for accomplishing different types of welds.

Figure 8 illustrates a butt weld performed by a coil having the construction shown in Figure 5. The inner side surface of the applicator coil 10 is thinned down to a relatively sharp edge in order to concentrate the heat at the junction 23 of the work pieces 20, 21. We have found that the current density becomes greatest on those surfaces of the applicator coil that are nearest to the work, and likewise greatest on those portions of the work nearest to the applicator coil. As a consequence, the current flowing in applicator coil 10 will concentrate near the innermost edge thereof and the induced currents in the work pieces 20, 21 will become concentrated near the outer periphery of the junction 23, which is directly opposite the nearest portion of the applicator coil. The heating of the work pieces and resultant welding thereof will correspondingly be concentrated in this local region as indicated by the weld 43. The welding operation takes place quickly and simultaneously around the entire periphery of the work pieces without seriously heating the locating fixtures 44, 45 or the glass to metal seal 46. As a result the assembly may be made to close mechanical tolerances and will be free from objectionable non-uniform deformations.

With identical sets of parts accurately located for each welding operation, the only important factors are time of duration and magnitude and frequency of the alternating currents in the applicator coil 10. Both of these factors can be readily determined and accurately controlled so that our novel high frequency induction apparatus and method are very suitable in the mass production of uniformly high quality parts.

We have found that the intensity of heating of the portion of the work pieces nearest the applicator coil will increase directly with the magnitude and frequency of the current in the coil. The frequency range we have found satisfactory in this connection lies between 200 kc. and 2000 kc. although these limits are not necessarily critical.

We have found that not only is close spacing between the applicator coil 10 and the work pieces 20, 21 desirable for making an extremely localized weld, but that the electrical impedance of the coil terminals which consists largely of inductive reactance due both to reflections from the work by mutual induction and to the magnetic flux which links only the applicator coil, is also reduced thereby. This reduction in inductive reaction permits more current to flow for a given frequency and voltage. This voltage should be kept below that value at which it would spark across the applicator coil leads or terminals.

A relatively small spacing between the applicator coil 10 and the work pieces 20, 21 say less than 1/8 inch is satisfactory for a weld of the type discussed. The frequency of the currents in the applicator coil may be above a few thousand cycles a second. The power of the induced currents may be approximately 15 kw. per cm.$^2$ of weld area. Under these conditions a good weld may be made in a fraction of a second.

In accordance with our invention, it is also possible to make successful welds of this type wherein use is made of a single mandrel extending through both work pieces 20, 21 without objectionable heating of the mandrel at the junction of the work pieces. The relatively high frequency used in practicing our invention results in a relatively shallow penetration of the induced heating currents in the work pieces, which is less than the wall thickness of the tubular work pieces 20, 21. The deliberate limiting of the depth of penetration of the induced heating currents which may be accomplished by a proper choice of frequency, has permitted the successful butt welding of nickel tubing, having a wall thickness of only .007".

It is also to be understood that according to our invention the applicator coil 10 may be an electrical conductor of any appropriate physical shape and/or cross section and the invention is not critical as to the cooling means employed for carrying away dissipated electrical losses therefrom. Therefore, coils of divers construction fitting them for particular welding jobs may be provided according to our invention.

Different types of applicator coils adapted for special applications are shown in Figures 9, 10, 11, 12, 13, 14, 15 and 16.

Figure 9:
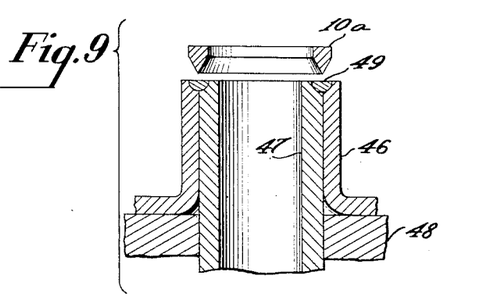

Figure 9 illustrates the use of an applicator coil 10 having a knife shaped end surface to weld the ends of two concentric close fitting work pieces 46, 47 by high frequency induction. The work holding fixture 48 and the weld nugget 49 are also shown.

Figure 10:
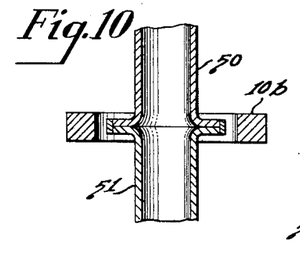

The localized heat pattern near the junction of the work pieces can also be obtained in another convenient manner illustrated in Figure 10. Here the active face of the applicator coil 10b is a side that is left relatively wide but the ends of the tubular work pieces 50, 51 are flared outwardly so as to present relatively thin edges to carry the induced current and thus confine the intense heating to the outermost periphery of the work pieces.

Figure 11:
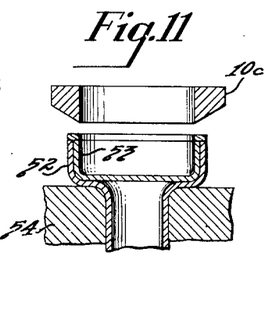

The same general principle of localization of heat as applied to concentric cylinders is shown in Figure 11. The cylinders include cup-shaped portions 52, 53, the free edges of which are to be joined in a weld. Cup-shaped portion 53 is made of a metal of higher melting point than member 52. An end surface of the applicator coil 10c in this case, is beveled slightly with a view to causing the edges of both cups 52, 53 to melt at the same time. The locating fixture 54 in this instance touches only the outer cup 52, the location of the inner cup 53 being determined by its mechanical fit into the outer cup referred to. We have accomplished a weld of this type with a heating time of only 1/120 of a second, using a 100,000 watt vacuum tube generator, controlled by an electronic modulator and timer of the type previously referred to herein. The average temperature rise of the work pieces immediately after the weld was almost imperceptible to the touch.

Figure 12:
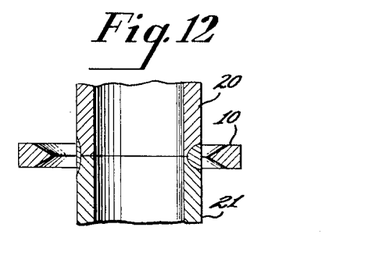
Figure 12 shows in section the relative position of the coil and the work pieces for securing a non uniform peripheral weld.

This invention also includes other means for accomplishing a predetermined non-uniform heating and other specific purposes wherein a selective welding action is desired, such as by the provision of a non-uniform shape or cross-section of the applicator coil around the work pieces to be welded, or an eccentric disposition of the coil 10 with respect to work pieces 20, 21, shown in Figure 12.

In all the examples of high frequency welding so far described, the paths of the high frequency alternating currents both in the applicator coil and in the work pieces extend in a more or less continuous manner around the periphery of the work pieces to be joined. This is not a necessary condition, however, since any conductor carrying an alternating current tends to set up by mutual induction a current in any nearby conductor. This induced current is substantially 180° out of phase with the inducing current and seeks a conducting return path in accordance with well known laws of electromagnetism. When the frequency of the induced currents is relatively high, as in high frequency induction welding, in accordance with the present invention, the depth of penetration of the currents in the conductors will be shallow so that all current paths will be substantially confined to the surfaces of the conductors.

Figure 13:
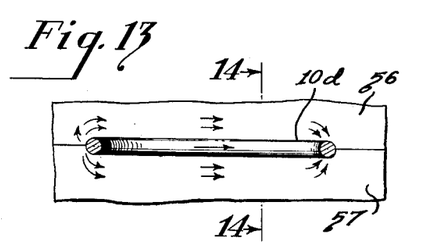
Figures 13 and 14 illustrate an arrangement where a straight line portion of a coil is utilized to perform a butt weld along a substantially straight line.

Referring to Figure 13 where the surfaces of the work pieces 56 and 57 are relatively large compared to the length and diameter of, or spacing from, the applicator coil 10d, the current paths will take the configurations indicated by the arrows. In the cross section of this figure shown in Figure 14, the dots indicate current out of the paper while the crosses represent current into the paper.

Figure 14:
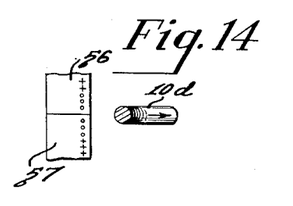

As shown in Figure 14, the induced currents in the surfaces of the work pieces 56, 57 closest to the applicator coil 10d, travel in an opposite direction to that of the current in the applicator coil, and take return paths on the same surfaces of the work pieces but at greater distances away from the applicator coil. The return path current is of course in the opposite direction to the directly induced current and of a considerably lower intensity. Since an induced current flows in the work pieces at their junction, $I^2R$ losses will cause the metal to heat, melt, fuse and weld as in the previous examples described herein. Any of the means previously described may be used to restrict the induced currents so as to intensify and localize the heating.

Figure 15:
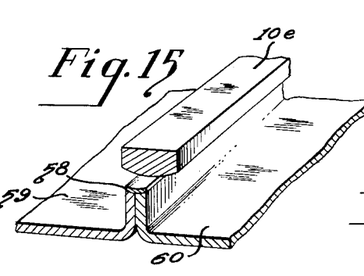
Figure 15 shows a welding operation joining two edges of work pieces disposed in side by side relations.

Another useful example is illustrated in Figure 15 where a long straight bead weld 58 is shown joining work pieces 59, 60. The inducing high frequency alternating current flows through applicator coil 10e, which is connected to an appropriate generator as previously described.

Figure 16:
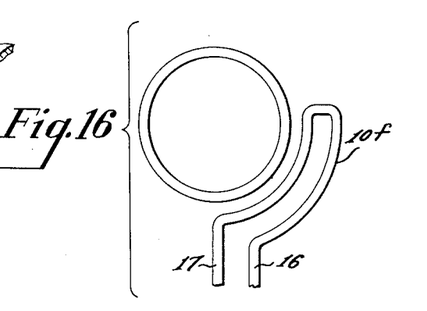
Figure 16 depicts a coil designed to weld a portion only of the periphery of work pieces.

The modification of our invention illustrated in Figure 16 concerns a situation where only a portion of the periphery of the work piece is intensely heated for welding. The applicator coil 10f is shown returning back to leads 16, 17 without surrounding the periphery of the circular work pieces involved in the welding operation. In this case the return currents in the work pieces will divide, some of the current returning around the entire periphery of the work pieces while another portion of the current will return along the side facing the applicator coil but in paths somewhat removed from the plane of the applicator coil in much the same manner as shown in Figures 13 and 14.

Figure 17:
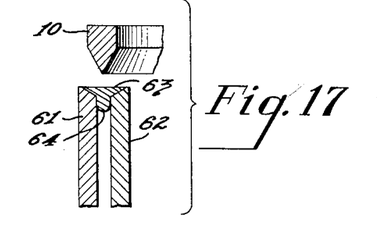
Figure 17 is a fragmentary sectional view of a weld accomplished between work pieces that are slightly spaced from each other.

In some welding operations it is not feasible to bring in close contact the edges of the work pieces to be welded. In this situation our novel induction welding apparatus and method are particularly advantageous, as shown in Figure 17. As has been indicated herein, the induced high frequency alternating current flow in the work pieces 61, 62 is substantially 180° out of phase with respect to the current in the associated applicator coil 10. Electrical conductors carrying such out of phase currents tend mutually to repel each other mechanically. In the modifications described the applicator coil is relatively rigid, but the molten weld metal 63 forming the other electrical conductor is in a liquid state and free to move. As a result, there will be a tendency for the molten weld metal to push away from the applicator coil and down into the weld junction, as at 64, which results in a deep and dense weld. This pushing effect therefore materially assists in making a tight weld in instances of this sort.

While reference herein has been made to the utilization of a special atmosphere surrounding the welding apparatus, this may be desirable in some instances, such as in the fabrication of electron discharge devices where contamination by the surrounding atmosphere may cause chemical reaction at the elevated temperatures employed during the welding operation. However, our invention is not limited to the use of such special atmospheres and may be employed in the natural atmosphere at pressures at, above or below atmospheric pressures.

From the foregoing it will be appreciated that our invention relates to a practical and advantageous welding apparatus and method utilizing high frequency energy and specially constructed applicator coils. The scope of our invention is such that it can be effectively employed for any type of weld between any two or more metals of the same or different melting points. In view of this broad application of our invention it is not the purpose of this specification to catalogue in detail all modifications thereof suitable for accomplishing the many different types of welds for which it is adapted.

Indeed, our novel apparatus for converting high frequency energy into a controlled source of heat for welding, is a tool, and like many other tools is capable of adaptation to many different welding jobs. To facilitate such adaptation our invention teaches that the value or characteristics of one or more factors involved in welding by high frequency induction, requires critical determination for each different welding job. The relationship between the requirements of a welding job and the value of the factors required for a weld by high frequency induction has clearly been indicated herein, so that it is well within the ability of a person skilled in the art to determine the characteristics of these factors once it is known what type of weld is desired.

While certain of the aspects of our invention concern the structure of our novel welding tool, other aspects relate to our novel method of welding by high frequency induction. For example, the mere utilization of the high frequencies which we have found suitable for a welding operation by electrical induction, involves a step in a method that we believe is novel. Our invention may also be viewed as constituting one or more elements of a system.

It will therefore be understood that while certain coil structures are illustrated and described herein and certain procedures are outlined, the references to such structures and procedures are merely for the purpose of illustrating the invention and are not to be regarded as limitations thereof.

In the interests of further clarification of the invention, several examples will be now described, wherein the type of weld has been determined and the variables of our apparatus and method have been fixed to meet the problems involved in such weld.

The first example relates to a type of weld illustrated in Figure 9 wherein the ends of two close fitting work pieces 46, 47 of cylindrical form are to be welded together. In this instance the work pieces are made of steel, having a thickness of $\frac{1}{16}$ inch and a diameter of 6 inches. These conditions will indicate that a convex weld of the type illustrated is desired. This is because a weld of this type affords the largest area of weld contact between the work pieces and is permitted by the relatively thick walls thereof.

Our invention teaches that to make this type of weld a coil having a relatively sharp taper facing the work for concentrating the flux, is desired. Furthermore, to localize the weld so that it may not extend all the way across the two work pieces but shall be concentrated at a central location where the weld will be more effective, the spacing between the work coil and the work pieces should be moderately close. In this illustration we prefer to use a stationary jig 48 for supporting the work pieces, and in view of this, the required uniformity of the weld will be dependent upon a relatively close spacing between the coil leads, which, in view of such close spacing should be provided with insulation as shown in Figure 5 to prevent voltage breakdown therebetween. Furthermore, in view of the relative thickness of the work pieces, the time duration of the welding cycle may be relatively long provided the frequency and power are kept relatively low. The frequency should preferably be low in view of the relatively great penetration of currents at low frequency values. If the power is relatively high at the low frequency indicated, the time duration of the cycle should be relatively short.

In the example discussed, we found the values for these factors readily in accordance with our invention, first, broadly to provide a generally satisfactory weld, and then by slight modification of these values in a direction suggested by the nature of the first weld, to provide a perfect weld. The final values involved a spacing between the coil and the work pieces of .070''. The oscillator used was of the type shown in Figure 2 and the power thereinto was 125 kw. The frequency of the oscillations was about 400 kc. The depth of the weld was $\frac{1}{16}$ inch and the time duration of the welding cycle was three quarters of a second. These values and characteristics of the variables involved in our novel apparatus and method produced a uniform and strong weld.

Before proceeding with the description of another specific example, it might be advantageously mentioned at this point, that if a number of welding operations are desired such as in the mass production of a device requiring this weld, the conditions necessary for a good weld in accordance with our invention, can be repeated in exactly the same manner by fixing suitable controls, thus obviating the need for adjusting the values of the factors required for a perfect weld in subsequent welds. Our invention is therefore particularly suitable for mass production methods.

Another specific example of values of the variables of our invention that were found suitable for a perfect weld, involved the welding together of relatively thin work pieces shown in Figure 11. The work pieces were made of steel having a thickness of .016 inch and a diameter of 1.20 inches. In this situation a relatively shallow weld was called for in view of the thinness of the walls of the work pieces. Furthermore, in view of this thinness a convex weld such as previously described, was unsuitable. A weld extending entirely across the work pieces appeared most practical.

In this case we used a coil of the shape shown in Figure 10 having a flat edge facing the work pieces. The coil shown in Figure 11 is suitable when the inner work piece 53 has a higher melting point than the outer work piece 52, since this coil shape involving a sloping end surface will produce a greater flux concentration on the higher melting point metal. We found a frequency of about 400 kc. and the use of an oscillator of the type shown in Figure 2, and employing an RCA 9C21 electron discharge device having a rated output of 100 kw. suitable in association with a spacing between the work coil and the work pieces of .020 inch and a time duration of the welding cycle of $\frac{1}{125}$ of a second. In this example we found that we could limit the depth of the weld by reducing the time duration of the welding cycle. We might have accomplished somewhat similar results by using a higher frequency at a lower power and a longer time. However, our concern was directed to the fact that the weld could not be confined by the concave shape of the work pieces at their junction with the weld, as in the previous example. Therefore, to prevent the molten metal from flowing away from the weld location, an extremely short time duration of the welding cycle was found most suitable. In view of this short duration of the cycle, a relatively low frequency was desirable to give an appreciable depth to the weld. The relatively low power contributed to the prevention of an excessively deep weld.

The values found desirable in the two previous examples, may be recorded, if similar welds are not to be repeated immediately, so that the values found to be best for welds of this type may be determined immediately when a similar weld is desired at a future date, thus avoiding the need for adjusting the values anew.

The requirements of other types of welds involving work pieces of any shape or structure and requiring welded joints of any character, can be determined with a readiness equal to that involved in the two examples just described, in accordance with our invention.

While our invention has been shown as embodied in different structures and assemblies, it is not to be regarded as limited thereto. For example, while the timing modulation of the welding cycle described herein and illustrated in Figures 3 and 4, are advantageous under certain conditions, they are not necessary for a practice of the invention. In some instances where suitable materials are involved in the weld, such as steel Kovar and certain other metals, the weld may be made without preheat and anneal. However, where the work pieces comprise alloys such as Monel metal, the weld and anneal sequence shown in Figures 3 and 4 may be very desirable without the preheat sequence. In other instances such as in the case of copper work pieces we may use to advantage a preheat and weld sequence only.

It will be apparent that where the preheat and/or annealing sequences are added to the welding time, a larger amount of total heat is involved, thus heating the work pieces to much higher temperatures than if the work pieces were not preheated or annealed.

Additional variations may be made in our invention without departing from its spirit and scope as pointed out in the appended claims.

We claim:

1. In an induction welding system, a modulator and timer for controlling the magnitude and duration of power applications to said system, said timer and modulator including a plurality of stators in a circular array connected to power sources of different power values, one of said stators having less extent in said array than the others of said stators and being connected to the power sources of maximum power value, and a rotor electrically connected to said system and having a contact member of less extent in said array than any of said stators, for successively and individually contacting said stators for energizing said system in steps of different power values for providing a good weld with reduced danger of overheating said system.

2. In an induction welding system including an oscillator, the improvement comprising a modulator and timer for controlling the output of said oscillator to provide a cycle including a relatively long preheat period, a relatively short welding period and a relatively long post-heating period for securing a good weld, said modulator and timer including a plurality of stators of arcuate form circulary arrayed, two of said stators having a relatively large arcuate extent, a third stator between said two of said stators and having a relatively small arcuate extent, a fixed voltage supply for each of said stators, the voltage supply for said third stator being higher in the direction of one polarity than the voltage supplies of said two of said stators, and a rotor including a contact member having less arcuate extent than any one of said stators and rotatable at a constant velocity for individually and successively contacting said stators, whereby electrical connection of said rotor to the input of said oscillator provides a successively different energization of said oscillator for successively different time intervals for providing said preheat, welding and post-heating periods of said welding system.

3. A radio frequency induction welding system comprising a work coil of solid and relatively massive structure for providing a thermal reservoir of predetermined relatively large heat receiving capacity for receiving by conduction heat directly generated in restricted work portions of said coil without overheating said coil, and a timer for controlling power application to said coil and limiting the duration of said power application to an interval for generating a heat quantity in said work portions that is substantially equal to the heat receiving capacity of said thermal reservoir, whereby said system is characterized by improved heat dissipation and said coil is protected from overheating.

4. A radio frequency induction welding system comprising a work coil of solid and relatively massive structure having a restricted work portion and another portion for providing a thermal reservoir for receiving heat for said work portion for preventing overheating of said coil during a welding operation, and a timer for controlling power application to said coil for generating heat at a predetermined rate in said work portion thereof required for a weld, said timer including a movable element for connecting said coil to a power supply for a time interval to provide a heat quantity in said work portion within the heat capacity of said thermal reservoir without overheating the coil.

5. A radio frequency induction welding system comprising a work coil having a restricted work portion for heat generation therein in three steps for preheating, welding and post-heating purposes, said coil including another and relatively massive portion integral with said work portion for receiving heat by conduction from said work portion and for dissipating said heat, said massive portion having predetermined heat holding and heat dissipating properties for preventing overheating of said coil; and a timer for connecting said coil to a power source, said timer including a rotatable contact member connected to said coil and three stator elements for successive contact with said contact member and connected to different power values of the power source, said stator elements having lengths for engaging said contact member for predetermined time intervals for generating heat in said coil for said preheating, welding and post-heating purposes within the limits of said predetermined heat holding and heat dissipating properties of said massive portion, whereby a good weld is provided without danger of overheating said coil.

LLOYD P. GARNER.
WM. N. PARKER.

REFERENCES CITED

The following references are of record in the file of this patent:

UNITED STATES PATENTS

| Number | Name | Date |
|---|---|---|
| 1,207,915 | Heany | Dec. 12, 1916 |
| 1,592,388 | Slepian | July 13, 1926 |
| 1,916,434 | Northrup | July 4, 1933 |
| 1,936,309 | Northrup | Nov. 21, 1933 |
| 2,024,906 | Bennett | Dec. 17, 1935 |
| 2,099,511 | Caesar | Nov. 16, 1937 |
| 2,217,546 | Hagedorn | Oct. 8, 1940 |
| 2,276,994 | Milinowski | Mar. 17, 1942 |
| 2,279,854 | Whitney | Apr. 14, 1942 |
| 2,314,691 | Dawson et al. | Mar. 23, 1943 |
| 2,321,189 | Dravneek | June 8, 1943 |
| 2,329,944 | Schakenbach | Sept. 21, 1943 |
| 2,350,797 | Moreland et al. | June 6, 1944 |
| 2,367,715 | Chapman | Jan. 23, 1945 |
| 2,381,496 | Hansell | Aug. 7, 1945 |
| 2,397,990 | Sherman | Apr. 9, 1946 |
| 2,408,229 | Roberds | Sept. 24, 1946 |
| 2,420,744 | Hansell | May 20, 1947 |
| 2,427,781 | Hansell | Sept. 23, 1947 |
| 2,439,890 | Hings | Apr. 20, 1948 |
| 2,446,202 | Vang | Aug. 3, 1948 |
| 2,448,527 | Hansell | Sept. 7, 1948 |
| 2,449,077 | Lindenblad | Sept. 14, 1948 |
| 2,459,971 | Stanton | Jan. 25, 1949 |
| 2,473,915 | Slepian et al. | June 21, 1949 |
| 2,478,640 | Roberds | Aug. 9, 1949 |
| 2,485,785 | Storm | Oct. 25, 1949 |
| 2,493,839 | Thomas et al. | Jan. 10, 1950 |